Feb. 6, 1962    M. BASCHE ETAL    3,020,387
ELECTRON BEAM HEATING DEVICES

Filed June 3, 1959    10 Sheets—Sheet 2

INVENTORS
Malcolm Basche
Mathias V. Comerford
BY Nicholas E. Doyle, Jr.
James S. Hetherington
Morse & Altman
ATTORNEYS 3,020,387
ELECTRON BEAM HEATING DEVICES
Malcolm Basche, Newtonville, Matthias F. Comerford, Watertown, Nicholas E. Doyle, Jr., Brookline, and James S. Hetherington, Boston, Mass., assignors, by mesne assignments, to Alloyd Electronics Corporation, Cambridge, Mass., a corporation of Delaware
Filed June 3, 1959, Ser. No. 817,812
9 Claims. (Cl. 219—50)

The present invention relates to heating by electron bombardment and, more particularly, to a versatile device for effecting such electron bombardment techniques as zone refining, welding, drip melting, annealing, etc. Such heating techniques possess advantages over conventional heating techniques in that they protect the work from contamination by maintaining a high vacuum and permit the temperature to be precisely controlled by electrically determining the electron beam energy transmitted. Generally, such a device comprises: a hermetic enclosure which is continuously evacuated to low pressure in such a way that any vapors emitted by the work are withdrawn from the enclosure as soon as generated; a low potential source from which electrons are emitted in order to generate heat in the work toward which they are directed; a holder for positioning the work within the enclosure; and a power supply for generating an electro static field between the source and the work.

The present invention relates to such an electron beam heating device comprising a plurality of associated components which are designed for detachable connection to the hermetic enclosure in order to perform a variety of electron beam heating functions in versatile fashion. More particularly, the hermetic enclosure is provided with a plurality of normally closed ports and a plurality of modules for performing various operations within the enclosure. The construction is so designed that any selected module may be mated with any selected port in a manner which provides unprecedented versatility. Thus, for example, an electron gun module operatively connected within the enclosure and a work holder module operatively connected to one of the ports may be selectively associated as desired to perform electron welding or zone refining.

Other objects of the present invention will in part be obvious and will in part appear hereinafter.

For a fuller understanding of the nature and objects of the present invention, reference should be had to the following detailed disclosure taken in connection with the accompanying drawings wherein.

Figure 1:
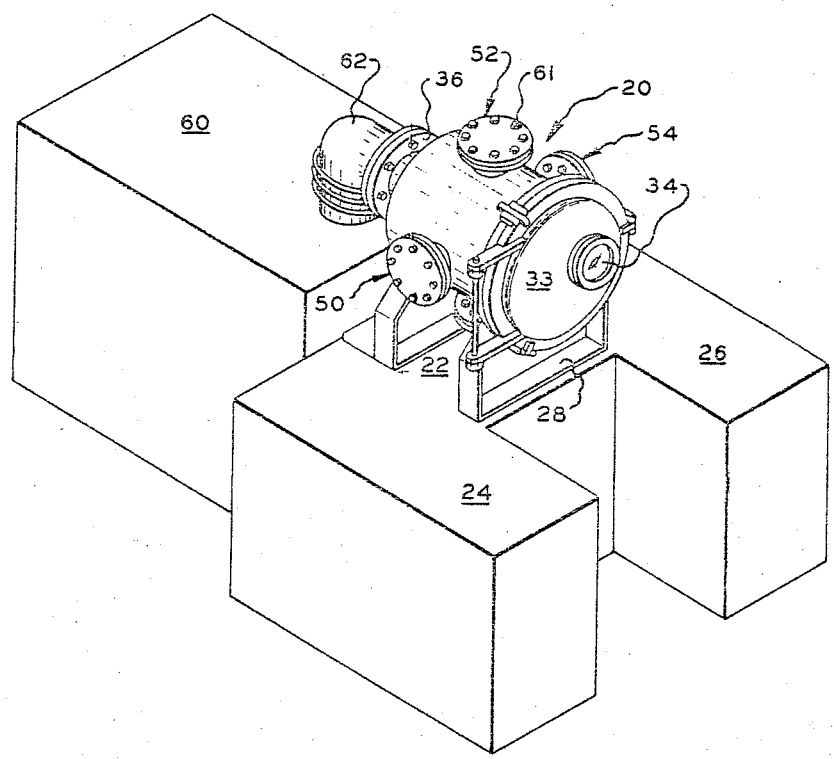
FIG. 1 is a perspective view of a device embodying the present invention.

Generally, each of the illustrated embodiments of the present invention comprises a table at which an operator may be seated, a hermetic enclosure providing a plurality of ports through and a plurality of mounts in the enclosure, a plurality of modules for association with the ports and mounts in order to perform various operations, and a power supply providing terminals and leads for connection within the enclosure to the modules. Normally, one of the modules provides a holder for positioning work within the enclosure and another provides an electron gun for directing a beam of electrons toward the work. The modules are designed for interchangeability in such a way that only a few modules need be provided in order to perform a variety of electron beam heating processes, i.e. zone refining, welding, drip melting, high temperature creep studies, cathode etching, annealing and various combinations thereof. During operation of the device, the hermetic enclosure is continuously evacuated by a mechanical fore pump and a oil diffusion pump, which cooperate to maintain the pressure within the hermetic enclosure at an extremely low value, preferably less than 0.01 micron of mercury, notwithstanding any gaseous discharges from the work. The mounts within the hermetic enclosure are provided with certain alternative like mechanical connections to which corresponding reciprocal like mechanical connections on one or more of the modules may be mated. The ports through the hermetic enclosure are provided with certain alternative like connections to which corresponding reciprocal like mechanical connections on one or more of the modules may be mated. The connections provided by the ports and the reciprocal connections provided by the modules are provided with seals which render the interconnections hermetic. The hermetic enclosure is provided with a plurality of alternative electrical connections by which modules so mated are provided with power.

FIGS. 1, 2, 3 and 4 show a hermetic enclosure 20, in accordance with the present invention, mounted upon a table 22 at which an operator may be seated and in association with which are located cabinets enclosing components of the system to be described below. As shown table 22 includes at opposite sides a pair of cabinets 24 and 26, within which the electrical and the control systems are enclosed. Table 20 includes a horizontal panel 28 upon which evacuated enclosure 20 is supported. Enclosure 20 is provided by a generally cylindrical casing 30, at the rearward end of which is an outwardly convex closure 33. Closure 32 has a port 34, the outward edge of which is provided with a flange 36. Flange 36 is disposed in a plane perpendicular to the axis of port 34. Closure 33 is provided with a port 38 the axis of which is disposed at an angle to the axis of cylindrical casing 30. Port 38 is provided with a flange 40 having a depression 42 that receives a sight glass 44. Sight glass 44, which is clamped in position by a ring 46, for example, is composed of X-ray-opaque but light-transparent lead glass that shields the operator from any X-radiation. Closure 33 is pivotally connected to casing 30 by a suitable hinge 48.

At 90° intervals around the circumference of casing 30 are four ports 50, 52, 54 and 56, all of which have flanges 58 that present coupling areas of like conformation and provide bores of like diameter and relative location. These flanges are intended to be mated with reciprocal flanges of the various modules to be described below. Alternatively, these flanges are mated with reciprocal caps 59 that present coupling areas of like conformation and that provide bores of like diameter and relative location. Any flange of the ports and any flange selected from either the reciprocal flanges of the modules or corresponding areas of the reciprocal caps may be coupled with an O-ring therebetween, by threaded nuts and bolts 61. The O-ring which is composed of a suitable elastomer, for example, a rubber-like material, renders the inter-connection hermetic.

Communicating with chamber 30 through ports 34 are a mechanical fore pump 60 and a mercury diffusion pump 62. These pumps cooperate continuously to maintain the interior of casing 30 at an extremely low pressure when the device is in operation. As is best shown in FIG. 4, affixed to the interior of enclosure 20 are four pairs of dogs, each pair having one dog at the forward edge and the other at the rearward edge of casing 30. One dog of each pair is visible in FIG. 3 at 64, 66, 68 and 70. Dog 66 is broken away to show the dog 71 behind it. As shown each dog provides a horizontal face 72 and vertical face 74. Also provided are a vertical internally threaded bore 76 communicating with horizontal face 72 and a horizontal internally threaded bore 78 communicating with vertical face 64. Five insulated connectors 80 project through cap 32 and four insulated connectors 82 project radially through enclosure 20. These connectors provide power from a suitable supply to modules mounted on the various dogs and the various flanges of enclosure 20 in a manner to be described below.

Figure 5:
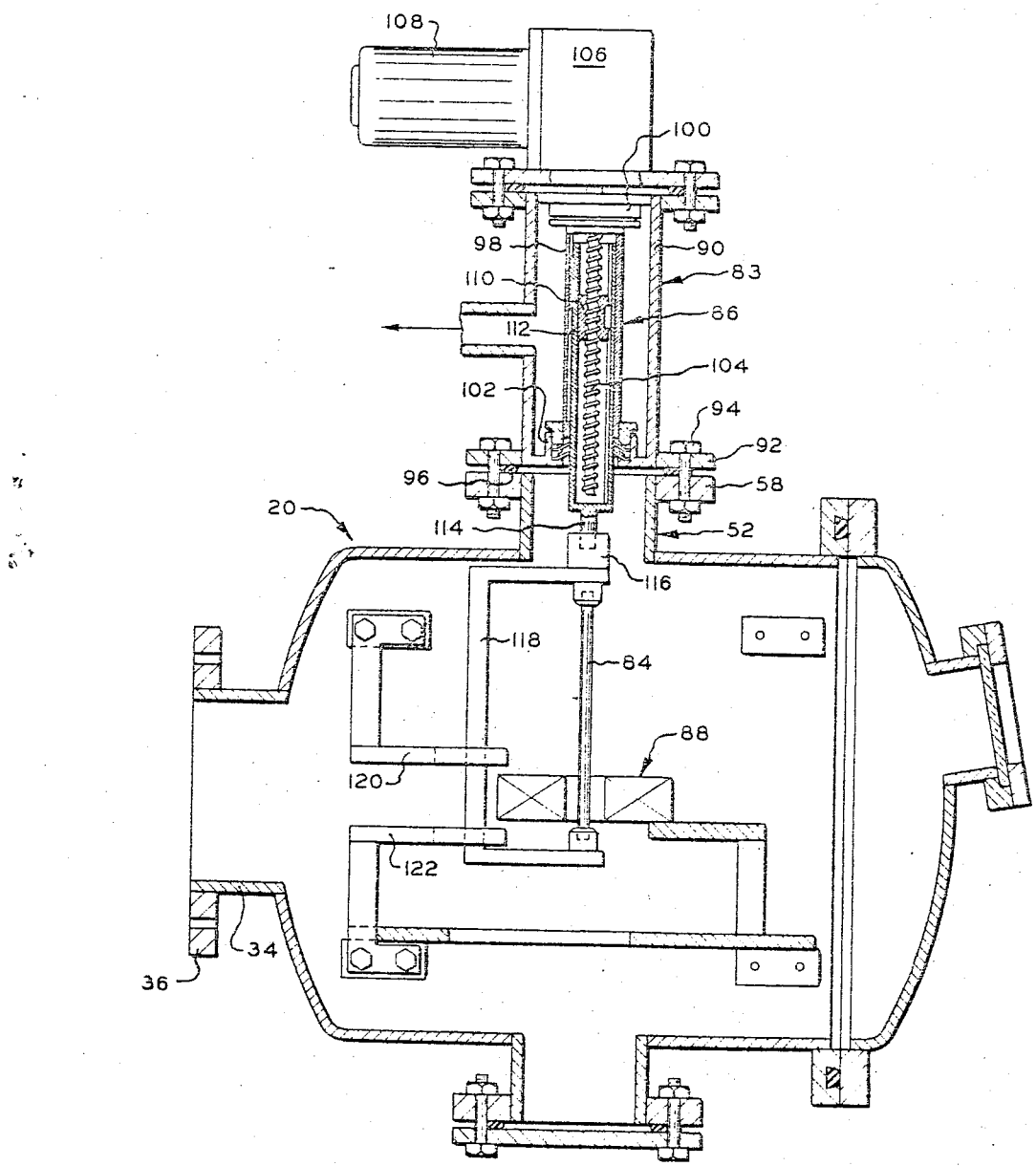
FIG. 5 is a cross-sectional view of the device of FIG. 1, taken substantially along the lines 5—5 of FIG. 4, showing an association of modules for performing a zone refining process.

In FIG. 5, enclosure 20 is disclosed in association with a pair of modules for effecting the zone refinement of an elongated metal rod 84. It is known that various impurities in an elongated metal rod may be removed by generating a floating zone of molten metal in the rod and moving the floating zone along throughout rod. The liquified zone has the ability to absorb impurities from adjacent solid zones and to retain them as it moves along the rod. As stated above, work 84 is in the form of a metal rod of the foregoing type to be purified. Rod 84 is mounted for vertical longitudinal movement by a mounting module 83 through an electron gun module 88. Mounting module 86 includes a sleeve 90 that is aligned with upper port 52 and that is provided with a flange 92. Flange 92 is mated with flange 58 by suitable bolts 94, which extend through openings in flanges 92 and 58. A suitable O-ring 96 is provided between flanges 92 and 58 for the purpose of hermetically sealing sleeve 92 to port 52. Extending downwardly through sleeve 90 is the hollow shaft 98, the upper and lower ends of which are sealed as at 100 and 102 to inwardly projecting flanges of sleeve 90. Extending through hollow shaft 98 is a helical screw 104, the upper end of which is driven through a suitable gearbox 106 by a motor 108. An internally threaded rider 110, moves along screw 104 as it rotates. Rider 110 is operatively connected to an inner sleeve 112, from the lower end of which projects a stub shaft 114. Stub shaft is affixed to a coupling 116. Extending downwardly from coupling 116 is a bow 118, between the arms of which work 84 is disposed. A pair of guides 120 and 122, which are supported on appropriate dogs, prevent bow 118 from rotating as stub shaft 114 advances. Thus, when motor 108 operates, work 84 advances through electron gun 88, which is now to be described.

Electron gun 88 is encased within a disk shaped housing 123. It includes a heated filament 124 which emits electrons thermionically, an accelerating mesh 126 that is at a higher potential than filament 124 in order to accelerate the electrons emitted therefrom, a focusing disk arrangement 128 for directing the beam toward the vertical axis of the gun and an annular shield 130 medially provided with a slip 132 for limiting access of the electron beam to a narrow region of the work. The various elements are spaced from each other by suitable insulators 134.

Figure 6:
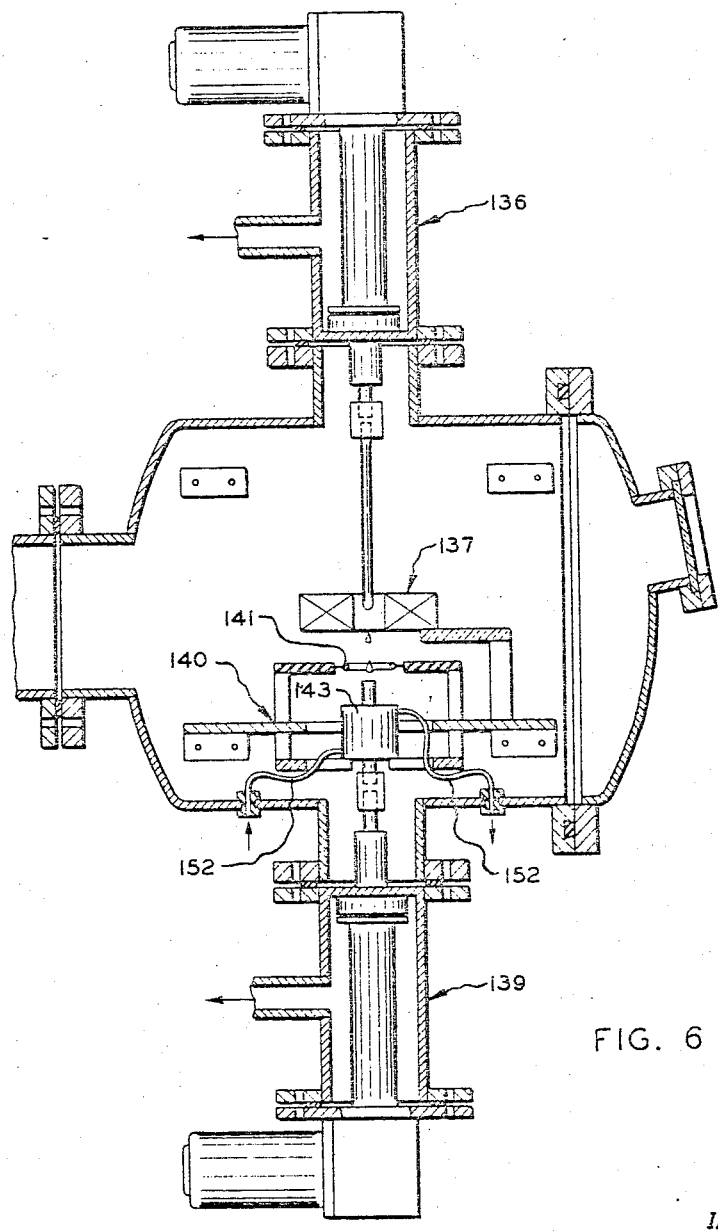
FIG. 6 is a cross-sectional view of the device of FIG. 1, analagous to the cross-sectional view of FIG. 5, showing an association of modules for performing a drip melting process.
Figure 7:
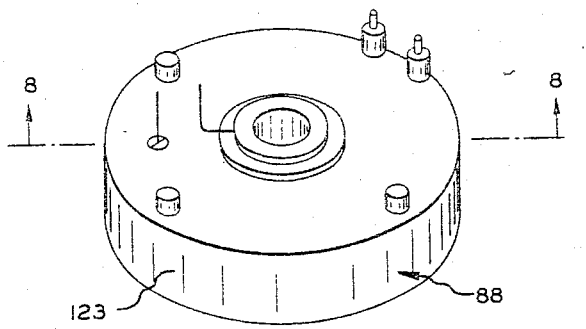
FIG. 7 is a perspective view of an electron gun embodying the present invention.
Figure 8:
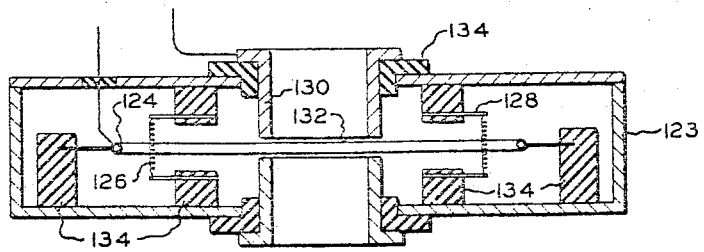
FIG. 8 is a cross-sectional view of the electron gun of FIG. 6, the section being taken substantially along the line 8—8.

In FIG. 6, there is shown the hermetic enclosure of FIG. 1 in association with a pair of modules for effecting a drip melting process therewithin. Drip melting provides a purification technique characterized by melting the work to produce droplets which are received in such a way that purified and solidified work material is built up in a cooling region. The modules here include: an advance feed module 136, which is identical to its counterpart in FIG. 4; a heating module 137 which is identical to its counterpart in FIG. 4; a heat exchange module 140, which is supported in the same way as heating module 137; and a retract feed module 139, which is identical to advance feed module 136. Heat exchange module includes a heater 141 for maintaining a liquid pool in that portion of the newly gathering work material which has not been cooled, and a cooler 143 for solidifying successive strata of the pool. Modules 136, 137 and 140 are carried by the hermetic enclosure in the manner described above. As stated above the mechanical components of modules 136 and 139 are identical, the difference between these modules being primarily merely in their orientation. Heat exchange module 140 is supported on available dogs and is provided with a fluid coolant through flexible hoses 152.

Figure 3:
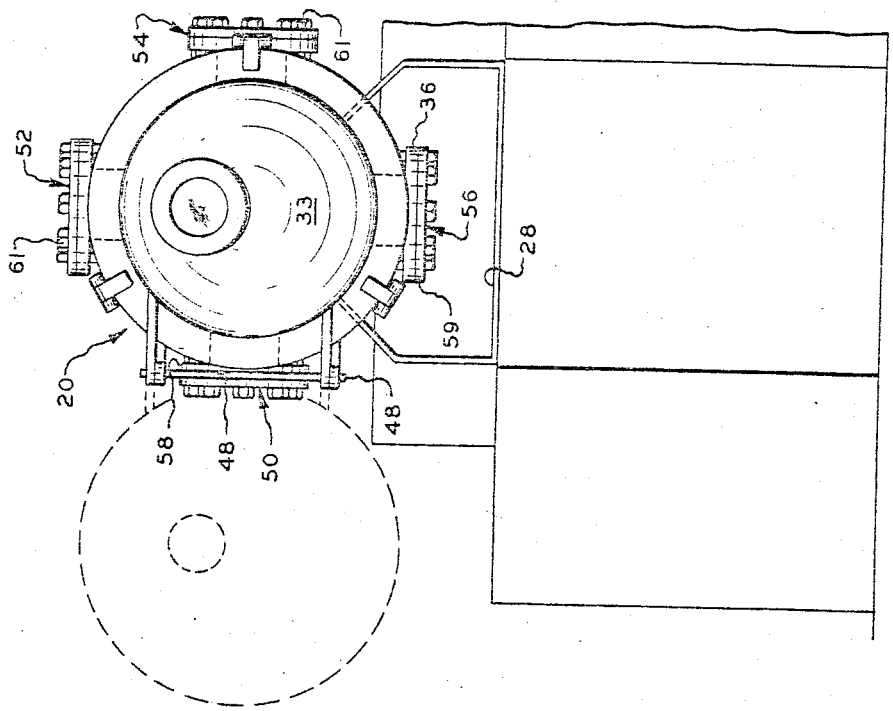
FIG. 3 is a front elevation of the device of FIG. 1.
Figure 2:
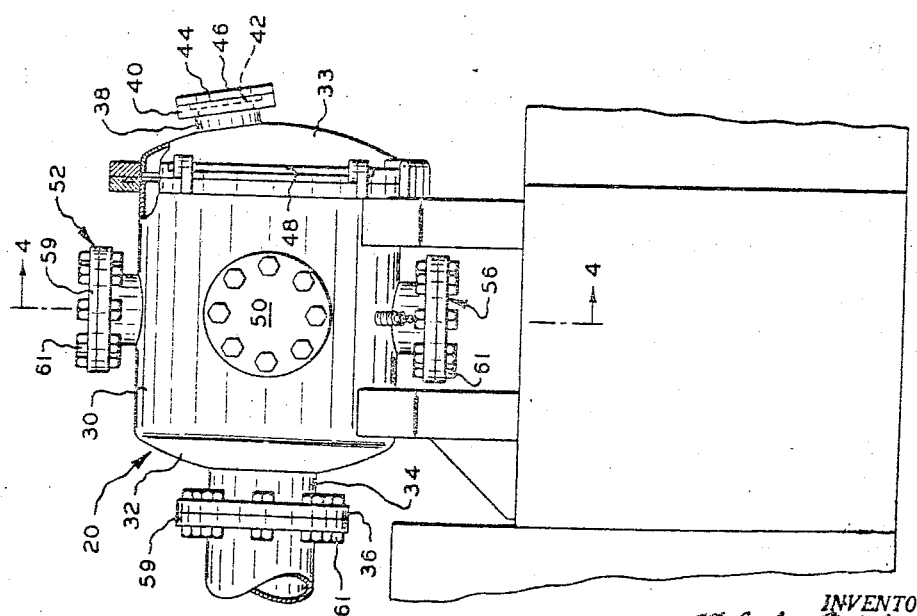
FIG. 2 is a side elevation of the device of FIG. 1.
Figure 4:
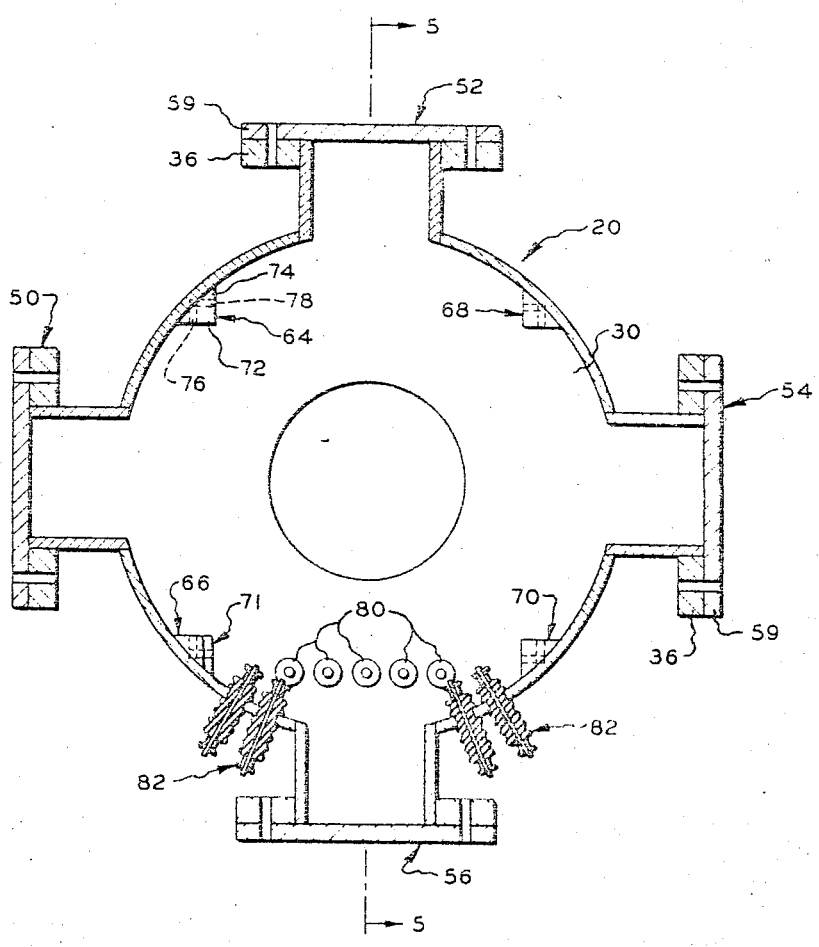
FIG. 4 is a cross-sectional view of the device of FIG. 1, taken substantially along the lines 4—4.
Figure 9:
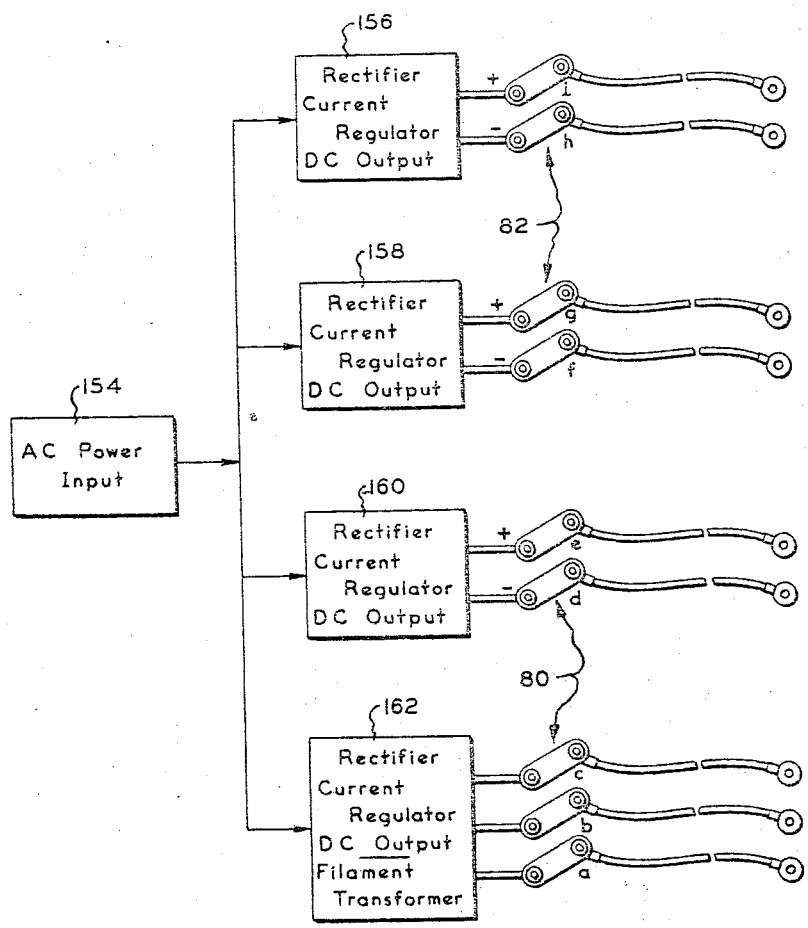
FIG. 9 illustrates the electrical system of the device of FIG. 1, partly in block diagram and partly in mechanical detail.

As is shown in FIG. 9, the insulated electrical connectors 80 and 82 of FIG. 3 supply power from a supply of the type shown in the block diagram. This power supply includes an alternating current input 154 and a series of current regulated power outputs 156, 158, 160 and 162. In the form shown, connectors 80 are designated $a$, $b$, $c$, $d$ and $e$ and connectors 82 are designated $f$, $g$, $h$, $i$. By way of example, the various terminals are capable of the following outputs; $a$ to $b$, 0–50 v. and 0–50 A; $b$ to $c$, 0–50 v. and 0–50 A; $d$ to $e$, 0–50 kv. and 0–750 ma.; $f$ to $g$, 0–12 kv. and 0–1 A; and $h$ to $i$, 0–5 kv. and 0–1 A; In an exemplary hookup of the system of FIG. 5, terminals $h$, $f$, $b$ and $e$ are connected together, terminal $i$ is connected to the accelerator of the electron gun, terminals $a$ and $c$ are connected across the filament of the electron gun and terminal $d$ is connected to the repeller of the electron gun and terminal $g$ is grounded.

Figure 10:
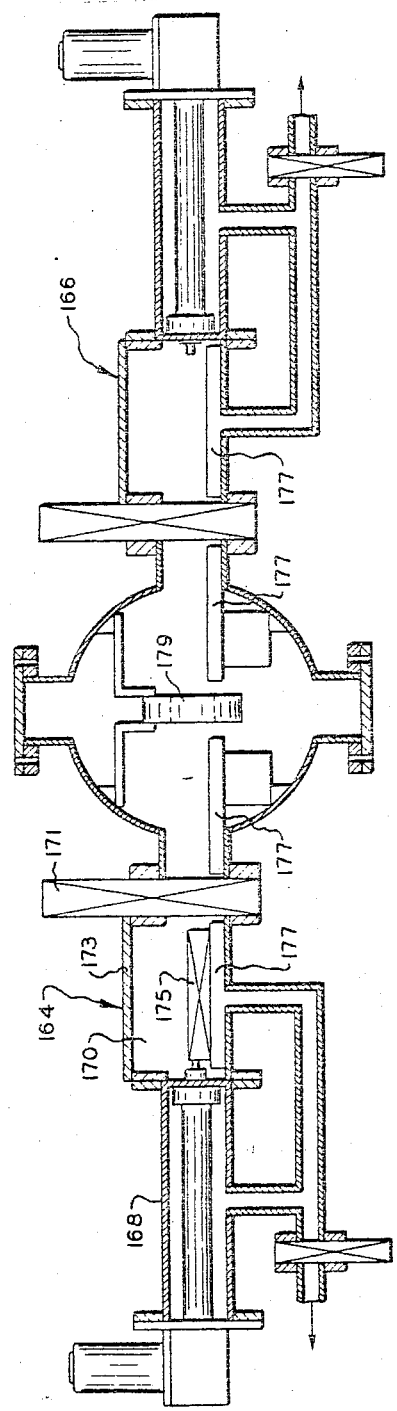
FIG. 10 is a cross-sectional view of the device of FIG. 1, in association with modules for effecting an automatic welding process.

FIG. 10 discloses the hermetic enclosure of FIG. 1 in combination with a pair of modules 164 and 166 that cooperate automatically to insert and withdraw work to be welded within the hermetic enclosure. Each of modules 164 and 166 includes a linear actuator 168 which is similar to its counterpart in FIG. 3, an interchange chamber 170 into which work may be placed and from which work may be removed before and after it is subjected to electron bombardment within hermetic chamber 30, and a suitable interchange valve 171 which serves to seal its associated interchange chamber, while it is opened, from the vacuum chamber. Interchange chamber 170 has a lid 173 which may be opened to permit the insertion of work into the interchange chamber and onto a holder. After the work has been so positioned, lid 173 is hermetically closed and chamber 170 is evacuated. Thereafter, interchange valve 171 is opened to permit work holder 175 to be directed upon suitable guides 177 through interchange valve 171 into position within the vacuum chamber. Within the vacuum chamber is an electron gun module 179 of the type described above at 88.

Figure 11:
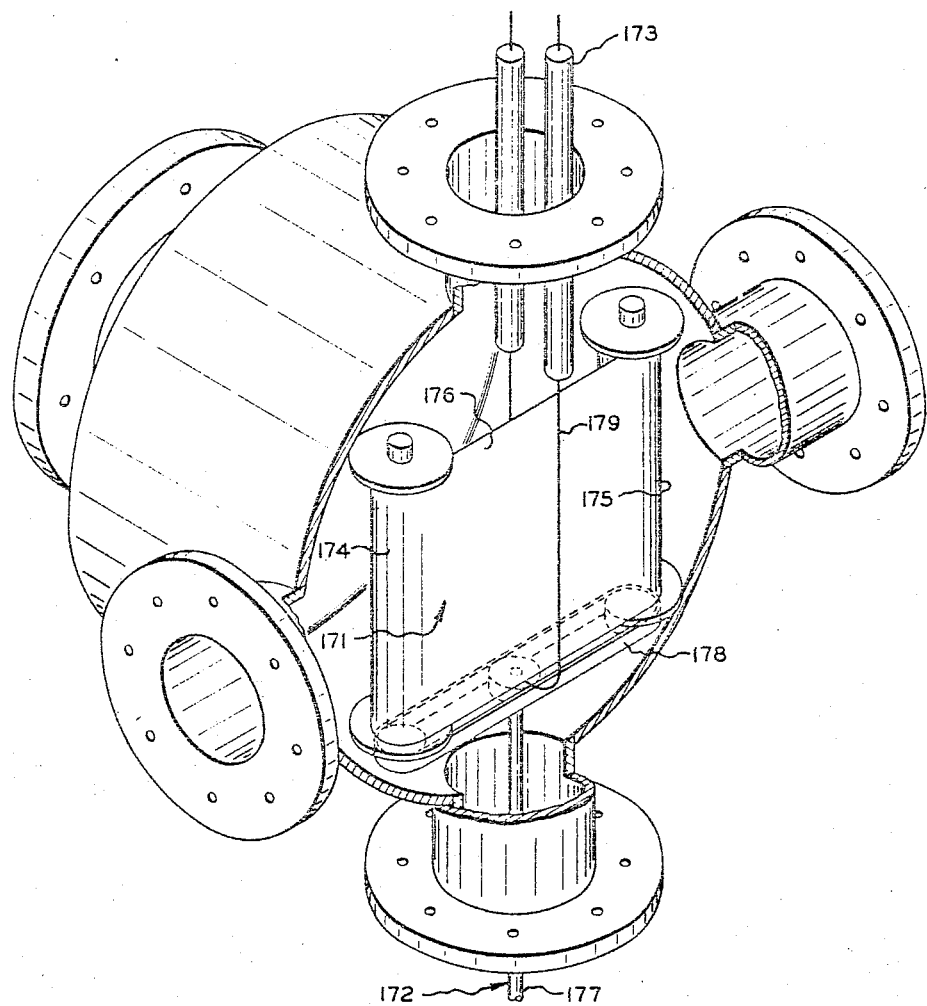
FIG. 11 is a broken-away perspective view of the device of FIG. 1, in association with modules for effecting an annealing process.

In FIG. 11 there is disclosed illustrative fragments of modules 171, 172, 176 and 173 for bright annealing metal foils in vacuum at moderately high temperature. Module 171 is mounted on dogs of the type described above and includes a supply spool 174 and a take up spool 175 for the foil 176 to be worked. Module 172 the hermetic chamber in order to drive a chain and sprocket system 178 that advances the foil from a supply spool 174 to take up spool 175. Module 173 includes an electron gun 179 in the form of a filament surrounding the foil in order to emit electrons toward the foil substantially in a given plane. Module 171 is mounted within the hermetic enclosure on available dogs. Modules 172 and 173 are mounted on the flanges of available ports for operation therethrough.

Figure 12:
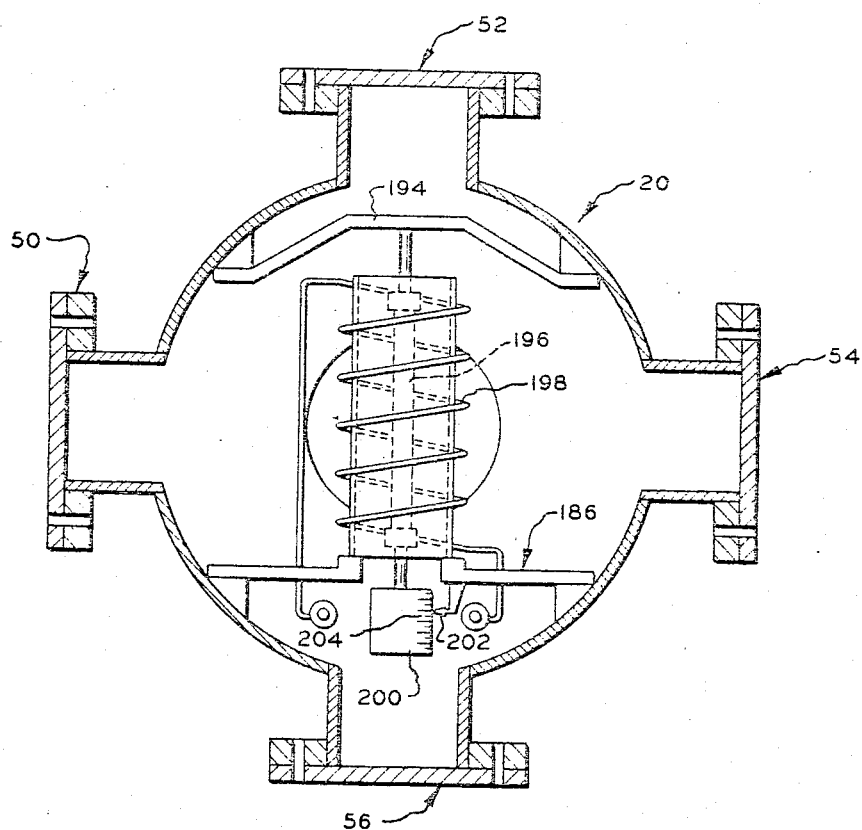
FIG. 12 is a cross-sectional view of the device of FIG. 1, analagous to the view of FIG. 4, in association with modules for determining high temperature creep.

In FIG. 12 is disclosed a module 186 for indicating high temperature creep without destroying or altering the composition of the work undergoing the test. This module may be bolted within the hermetic chamber and comprises: a support 194 from which the work 196 depends; a heating coil 198 about the work; and a weight 200 affixed to the other end of the work. A pointer 202 in conjunction with a scale 204 indicates the creep under the conditions of the experiment.

Since certain changes may be made in the above apparatus without departing from the scope of the invention herein involved, it is intended that all matter contained in the above description or shown in the accompanying drawings shall be interpreted in an illustrative and not a limiting sense.

What is claimed is:

1. An electron beam heating device comprising a hermetic enclosure having a plurality of ports at different positions therethrough and a plurality of mounts at different positions therein, means for continuously evacuating said enclosure, each of said ports having a first connecting means, each of said mounts having a second connecting means, and a plurality of modules, at least first of said modules having a third connecting means, at least a second of said modules having a fourth connecting means, any one of said third connecting means and any one of said first connecting means being adapted for mating, any one of said fourth connecting means and any one of said second connecting means being adapted for mating, one of said modules providing an electron beam source, one of said modules providing a holder for positioning work in association with said electron beam source, whereby said electron beam source and said holder may be located at selected ones of said different positions.

2. The electron beam heating device of claim 1, wherein at least one of said modules provides a drive means for moving said holder.

3. The electron beam heating device of claim 1, wherein at least one of said modules includes a heat exchange means having a heating unit and a cooling unit.

4. The electron heating device of claim 1, wherein said electrton beam source is provided with terminals through which it is energized, and wherein electrical terminals are provided within said enclosure and detachable jumpers are connected to said terminals of said electron beam source and of said enclosure.

5. The electron beam heating device of claim 1, wherein said electron beam source is carried by said first of said modules.

6. The electron beam heating device of claim 1, wherein said electron beam source is carried by said second of said modules.

7. The electron beam heating device of claim 1, wherein one of said modules supports said work at one end thereof and a weight is connected to said work at the other end thereof, and another of said modules provides an indicator for determining the elongation of said work.

8. An electrton beam heating device comprising a hermetic enclosure having a plurality of ports therethrough, means for continuously evacuating said enclosure, said ports providing like first connecting means, a plurality of modules providing like second connecting means, any one of said first connecting means and any one of said second connecting means being adapted for mating, an electron beam source mounted within one of said enclosure and said modules, and a holder mounted within one of said enclosure and said modules for positioning work in association with said electron beam source.

9. An electron beam heating device comprising a hermetic enclosure having at at least two ports at different positions therethrough, each of said ports having a first connecting means of first predetermined configuration, at least a module having a second connecting means of second predetermined configuration, said second connecting means being mated with one of said first connecting means so that said first configuration and said second configuration thereof are hermetically sealed to each other, at least one cap having a third connecting means of said second configuration, said third connecting means being mated with another of said first connecting means so that said first configuration of said other of said first connecting means; and said second configuration of said third connnecting means are hermetically sealed to each other, an electron beam source being mounted in one of said enclosure and said module, and a work holder being mounted in the other of said enclosure and said module, whereby said electron beam source and said work holder may be located at selected ones of said different positions.

References Cited in the file of this patent

UNITED STATES PATENTS

| 2,417,213 | Picard | Mar. 11, 1947 |
| 2,809,905 | Davis | Oct. 15, 1957 |
| 2,912,476 | Aschoff | Nov. 19, 1959 |
| 2,942,098 | Smith | June 21, 1960 |

FOREIGN PATENTS

| 555,785 | Italy | Jan. 30, 1957 |
| 745,629 | Great Britain | Feb. 29, 1956 |